(12) United States Patent
Martin et al.

(10) Patent No.: US 6,272,484 B1
(45) Date of Patent: Aug. 7, 2001

(54) ELECTRONIC DOCUMENT MANAGER

(75) Inventors: Anthony G. Martin, Los Altos, CA (US); Mark E. Pennell, Round Rock, TX (US)

(73) Assignee: Scansoft, Inc., Peabody, MA (US)

( * ) Notice: Subject to any disclaimer, the term of this patent is extended or adjusted under 35 U.S.C. 154(b) by 0 days.

(21) Appl. No.: 09/085,201

(22) Filed: May 27, 1998

(51) Int. Cl.[7] ..................................................... G06F 17/30
(52) U.S. Cl. ............................ 707/1; 707/100; 707/522; 345/348; 345/349; 345/350; 345/351
(58) Field of Search ................................ 707/100, 2, 522, 707/1; 345/348–351

(56) References Cited

U.S. PATENT DOCUMENTS

| | | | |
|---|---|---|---|
| 5,060,135 | * 10/1991 | Levine et al. ........................ | 364/200 |
| 5,231,578 | 7/1993 | Levin et al. ......................... | 707/512 |
| 5,706,457 | * 1/1998 | Dwyer et al. ........................ | 345/349 |
| 5,832,474 | * 11/1998 | Lopresti et al. ....................... | 707/2 |
| 5,956,483 | * 9/1999 | Grate et al. ..................... | 395/200.33 |
| 5,974,430 | * 10/1999 | Mutschler, III et al. ............ | 707/505 |
| 5,991,760 | * 11/1999 | Gauvin et al. ........................ | 707/10 |
| 6,005,563 | * 12/1999 | White et al. ......................... | 345/327 |
| 6,008,836 | * 12/1999 | Bruck et al. ............................. | 348/6 |
| 6,009,442 | * 12/1999 | Chen et al. .......................... | 707/522 |
| 6,018,748 | * 1/2000 | Smith .................................... | 707/501 |
| 6,026,433 | * 2/2000 | D'Arlach et al. .................... | 709/217 |
| 6,028,603 | * 2/2000 | Wang et al. .......................... | 345/350 |
| 6,061,055 | * 5/2000 | Marks .................................. | 345/327 |

OTHER PUBLICATIONS

Michalski, J.: "If Links Could Talk," *Release 1.0: Esther Dyson's Monthly Report*, Dec. 30, 1997.
"WebTV—Favorites" at http://www.webtv.net/ns/tune/homepeage/favs.html, Apr. 29, 1998.
"Adobe Acrobat: The Universal Electronic Publishing Tool" *Adobe Systems Incorporated*, USA 1995–95.

\* cited by examiner

*Primary Examiner*—Jack Choules
*Assistant Examiner*—Cheryl Lewis
(74) *Attorney, Agent, or Firm*—Blakely Sokoloff Taylor & Zafman (57) ABSTRACT

Method and an apparatuses for managing electronic documents on a digital processing system or computer. In one embodiment, a web page is accessed on the Internet at a first location. At least a portion of the web page is then displayed. An image file capturing the displayed visual representation of the web page is generated and stored on the computer at a second location. A thumbnail representation is generated from the displayed visual representation. The first location and the second location are then associated with the thumbnail. Textual information included in the displayed visual representation is preserved and added to a searchable database. Subsequent selection of the thumbnail representation allows one to access either the web page at the first location or access the image file stored at the second location. The image file may be viewed without having to access the electronic document at the first location. Annotations may be added to the stored image file in one embodiment. In another embodiment, data of the stored image file may be copied and included with executable viewing code to generate a self-contained viewing application to view the stored image file.

55 Claims, 8 Drawing Sheets

ELECTRONIC DOCUMENT MANAGER

BACKGROUND OF THE INVENTION

1. Field of the Invention The present invention relates generally to field of document management and, more specifically, the present invention relates to a method for managing electronic documents on a digital processing system or computer.

2. Background Information

The Internet and/or the World Wide Web have become convenient and inexpensive resources for finding information about nearly every subject imaginable. Users can shop for merchandise, get stock quotes, tune into radio programs, chat with other users and engage in a host of other activities. The tremendous in access to the World Wide Web (the web) has been fueled by the wide spread availability of computer programs called web browsers. A web browser is a client-side program for establishing communications between a client computer and a server computer on the web (i.e., a web server) using the hypertext transfer protocol (HTTP). In a typical transaction, a web browser transmits a request to download a document indicated by an address called a uniform resource locator (URL). The download request is routed through the web until it reaches a web server indicated by the URL. The web server responds to the request by transmitting the indicated document, commonly called a "web page," back to the client computer.

Web pages are usually written using the hypertext mark up language (HTML) and often include links to other objects. For example, a web page may include links to one or more graphics objects that are to be downloaded and displayed with the web page. A web page may also include links to program code (e.g., Java code) that is to be downloaded and executed on the client computer when the web page is displayed. The downloaded code may be used to create a more interactive presentation, for example, by animating portions of the web page or by prompting for user input. A web page may also include pointers to plug-in modules that are expected to be resident in the client computer. Such program modules are commonly referred to as "plug-ins" and are generally used to extend the capabilities of the web browser. For example, a plug-in may be invoked to generate audio output, perform file translation and so forth.

Occasionally, a computer user may wish to capture a web page for a later recall or to forward to another user. In many web browsers, this is accomplished by saving a copy of the underlying HTML document, including its links to graphics images, downloaded code, plug-ins and so forth. When the HTML document is recalled from storage, the HTML is reinterpreted by the web browser to regenerate the displayed web page. Assuming that the downloaded code, graphics images and plug-ins are available, the web page may be redisplayed with its original graphical and dynamic characteristics.

A significant disadvantage of using a stored HTML document to redisplay a web page is that the ability to faithfully reproduce the original web page display is dependent upon a number of factors that are independent of the stored HTML document. If any of these independent factors change, it is likely that the redisplayed web page will not be an accurate reproduction of the original. For example, a web page may be displayed differently depending on whether the same or a different web browser is used, whether the required plug-ins are available, whether a code execution engine (e.g., a Java virtual machine) is present and so forth. Inaccurate reproduction is particularly likely when a saved HTML document is electronically mailed to another user for display using the other users web browser, plug-ins and code execution engine. Consequently, the user mailing the HTML document cannot be certain that the receiving party will see the intended image. This uncertainty dramatically reduces the usefulness of many existing techniques for capturing web pages.

Figure 1:
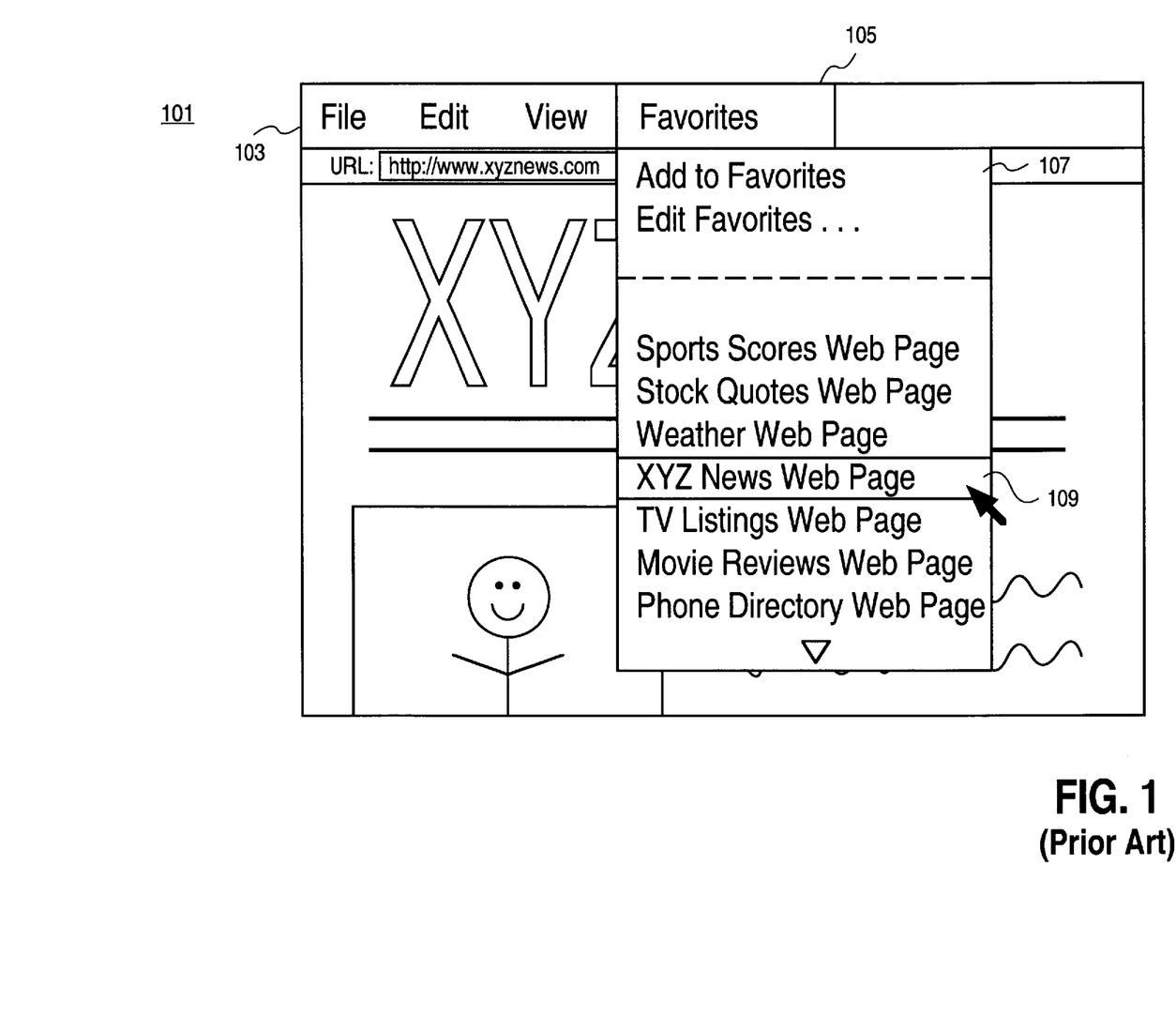
FIG. 1 is an illustration of the "Favorite" feature of a prior art web browser.

Another common activity for users that access the web periodically is to revisit particular web pages from time to time. One known method for simplifying revisiting web sites is to bookmark the web page as a "favorite" after visiting the web page. FIG. 1 is an illustration of a sample window 101 of a web browser illustrating the "Favorites" feature of the web browser. As shown in FIG. 1, a "Favorites" 105 command is included in a menu bar 103 of web browser window 101. In operation, a user navigates the web using the web browser until the user navigates to a desired web page. If the user desires to bookmark the particular web page as a "favorite," the user can select the command "Add to Favorites" 107 under the "Favorites" 105 menu as shown in FIG. 1. Assuming the user is browsing the "XYZ News Web Page" at the time the "Add to Favorites" 107 command is executed, an "XYZ News Web Page" entry 109 is added to the favorites 105 menu as shown in FIG. 1. Assume in this example that the URL for the "XYZ News Web Page" is "http://www.xyznews.com." In this example, "http://www.xyznews.com" will be associated with the "XYZ News Web Page" 109 entry in the "Favorites" 105 menu. Thus, if the user subsequently wishes to revisit the "XYZ News Web Page," the user simply needs to select the "XYZ News Web Page" 109 entry in the "Favorites" 105 menu. The web page located at the address "http://www.xyznews.com" will then be accessed in web browser window 101.

Figure 2:
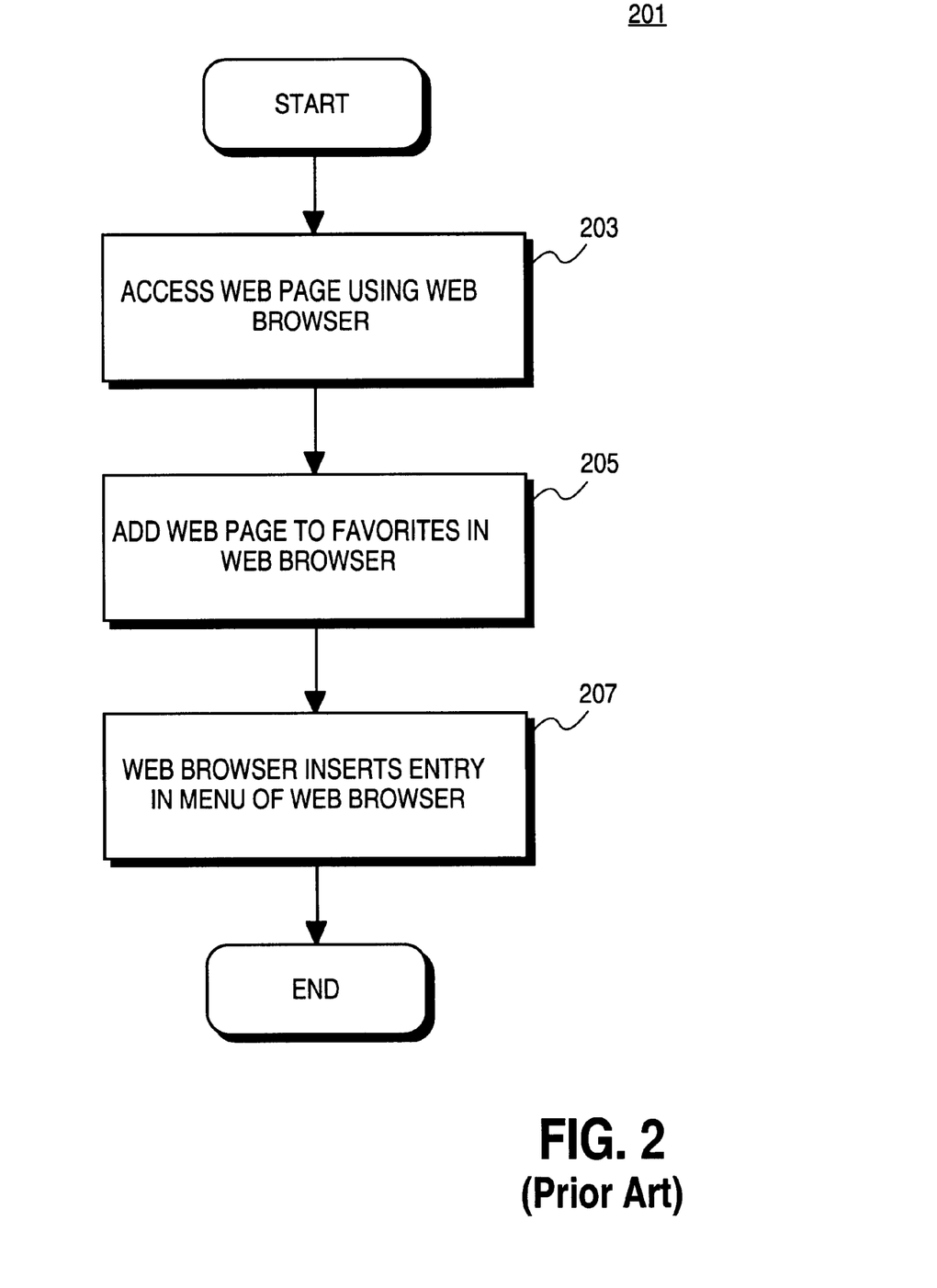
FIG. 2 is a flow diagram illustrating the steps performed when adding a web page to the "Favorites" menu in a prior art web browser.

FIG. 2 is a flow diagram 201 illustrating the steps performed when using the "Favorites" feature of the web browser illustrated in FIG. 1. As shown in FIG. 2, the desired web page is first accessed using the web browser as shown in processing step 203. Next the user indicates that the web page is to be added to the favorites in the web browser as shown in processing step 205. Finally, the web browser inserts an entry corresponding to the web page into the menu of the web browser, as shown in processing step 207.

One disadvantage of using the "favorites" feature of the web browser of FIG. 1 is that the web pages accessed by each entry in "Favorites" 105 menu may constantly change. Consequently if a user desired to revisit a web page using "Favorites" 105 menu, the web page may be modified, or may no longer even exist when the user attempts to access the web page at a later date.

Thus, what is desired are methods and apparatuses for managing electronic documents, such as for example but not limited to web pages, that addresses the problems discussed above. Such methods and apparatuses should enable a user to save web page information without the risk of losing the web page information later as a result of the web page being modified or removed from the web. In addition, such a method should enable a first user to provide a second user with a web page image as originally viewed by the first user.

SUMMARY OF THE INVENTION

A method of managing an electronic document is disclosed. In one embodiment, the method includes the steps of generating an image file capturing a displayed visual representation constructed from at least a portion of the electronic document accessed at a first location. The image file is then stored at a second location. The first and second locations are associated with a thumbnail representation of the image file. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Methods and apparatuses for managing electronic documents are disclosed. The subject of invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known or conventional details are not described in order not to unnecessarily obscure the present invention in detail.

A portion of the disclosure of this patent document contains material that is subject to copyright protection. The copyright owner has no objection to the facsimile reproduction by anyone of the patent document or patent disclosure, as it appears in the Patent and Trademark Office patent file or records, but otherwise reserves all copyright rights whatsoever. Copyright, © Visioneer 1998.

Figure 3:
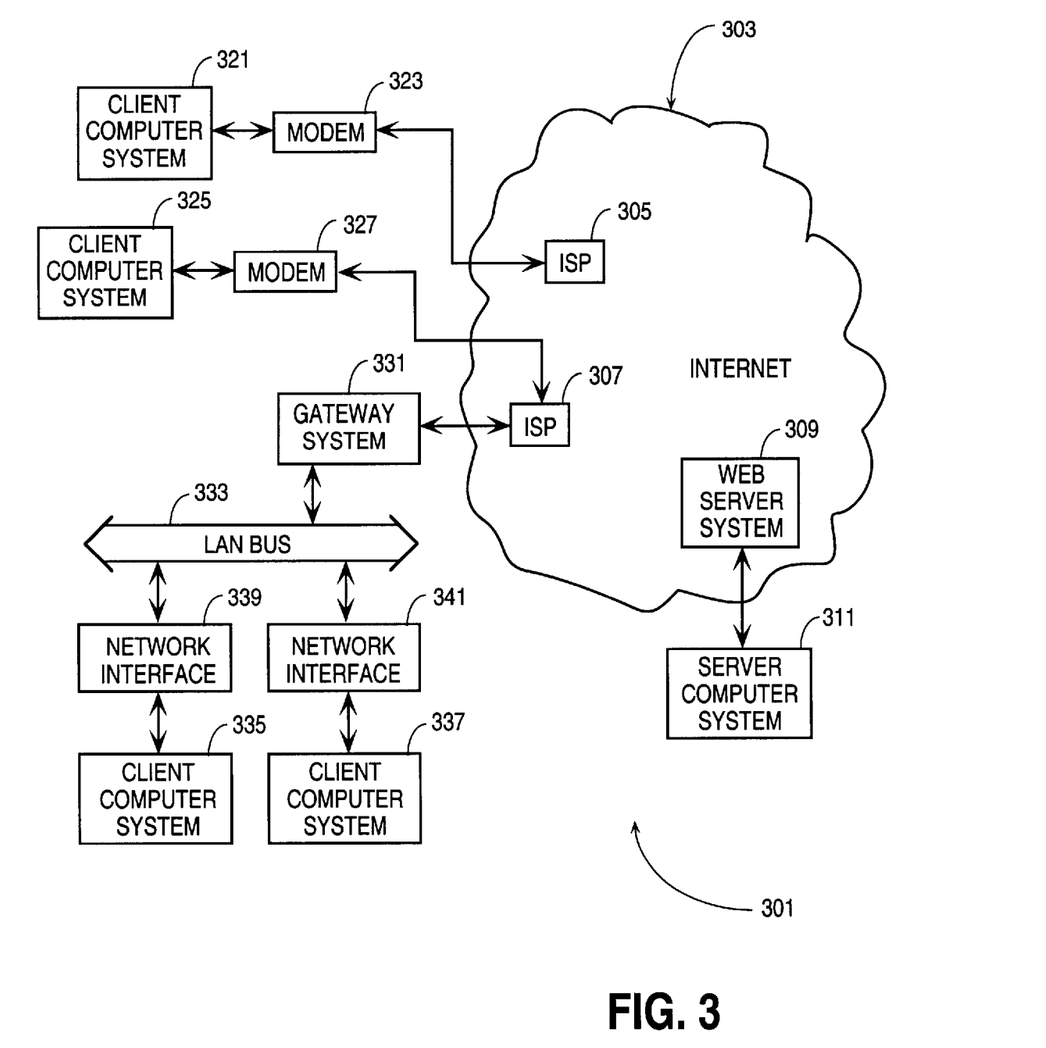
FIG. 3 is an illustration of an example of several client computer systems coupled to the Internet in accordance with the teachings of one embodiment of the present invention.

FIG. 3 shows several computer systems that are coupled together through the Internet 303. It will be appreciated herein that the term "Internet" refers to a network of networks that use certain protocols, such as for example the Transmission Control Protocol/Internet Protocol (TCP/IP) protocol, and possibly other protocols such as the HTTP for HTML documents. The physical connections of the Internet and the protocols and communication procedures of the Internet are well known to those in the art. Access to the Internet 303 is typically provided by Internet service providers (ISPs), such as the ISPs 305 and 307. Users on client systems, such as client computer systems 321, 325, 335 and 337 obtain access to the Internet through the Internet service providers, such as ISPs 305 and 307. Access to the Internet allows users of the client computer systems to exchange information, receive and send electronic mails and view electronic documents, such as for example electronic documents that have been prepared in the HTML format. These documents are often provided by web servers, such as web server 309, which is considered to be "on" the Internet. Often these web servers are provided by the ISPs, such as ISP 305, although a computer system may be set up and connected to the Internet without that system being also an ISP as is well known in the art.

The web server 309 is typically at least one computer system that operates as a server computer system and is configured to operate with the protocols of the web and is coupled to the Internet. Optionally, the web server 309 may be part of an ISP that provides access to the Internet for client systems. The web server 309 is shown coupled to the server computer system 311. It will be appreciated that while two computer systems 309 and 311 are shown in FIG. 3, the web server system 309 and the server computer system 311 may be one computer system having different software components providing the web server functionality and the server functionality provided by the server computer system 311.

Client computer systems 321, 325, 335 and 337 may each, with the appropriate web browsing software, view HTML pages provided by the web server 309. The ISP 305 provides Internet connectivity to the client computer system 321 through the modem interface 323, which may be considered part of the client computer system 321. The client computer system may be a "WINTEL" computer system (systems that run a Microsoft Windows operating system on an Intel microprocessor), a network computer, a Macintosh computer, a workstation, or the like.

ISP 307 provides Internet connectivity for client systems 325, 335, and 337, even though as shown in FIG. 3, the connections are not the same for these three client systems. Client computer system 325 is coupled through a modem interface 327 while client computer systems 335 and 337 are part of a local area network (LAN). While FIG. 3 shows the interfaces 323 and 327 as "modem," it will be appreciated that each of these interfaces may be an analog modem, Integrated Services Digital Network (ISDN) modem, cable modem, satellite transmission interface (e.g. "DirectPC"), Digital Subscriber Line (DSL) modem, or other interfaces for coupling a computer system to other computer systems.

Client computer systems 335 and 337 are coupled to a LAN bus 333 through network interfaces 339 and 341, which may be an Ethernet network or other network interfaces. The LAN bus 333 is also coupled to a gateway computer system 331, which may provide firewall and other Internet related services for the LAN. This gateway computer system 331 is coupled to the ISP 307 to provide Internet connectivity to the client computer systems 335 and 337. The gateway computer system 331 may be a conventional server computer system. In addition, the web server system 309 may be a conventional server computer system.

Figure 4:
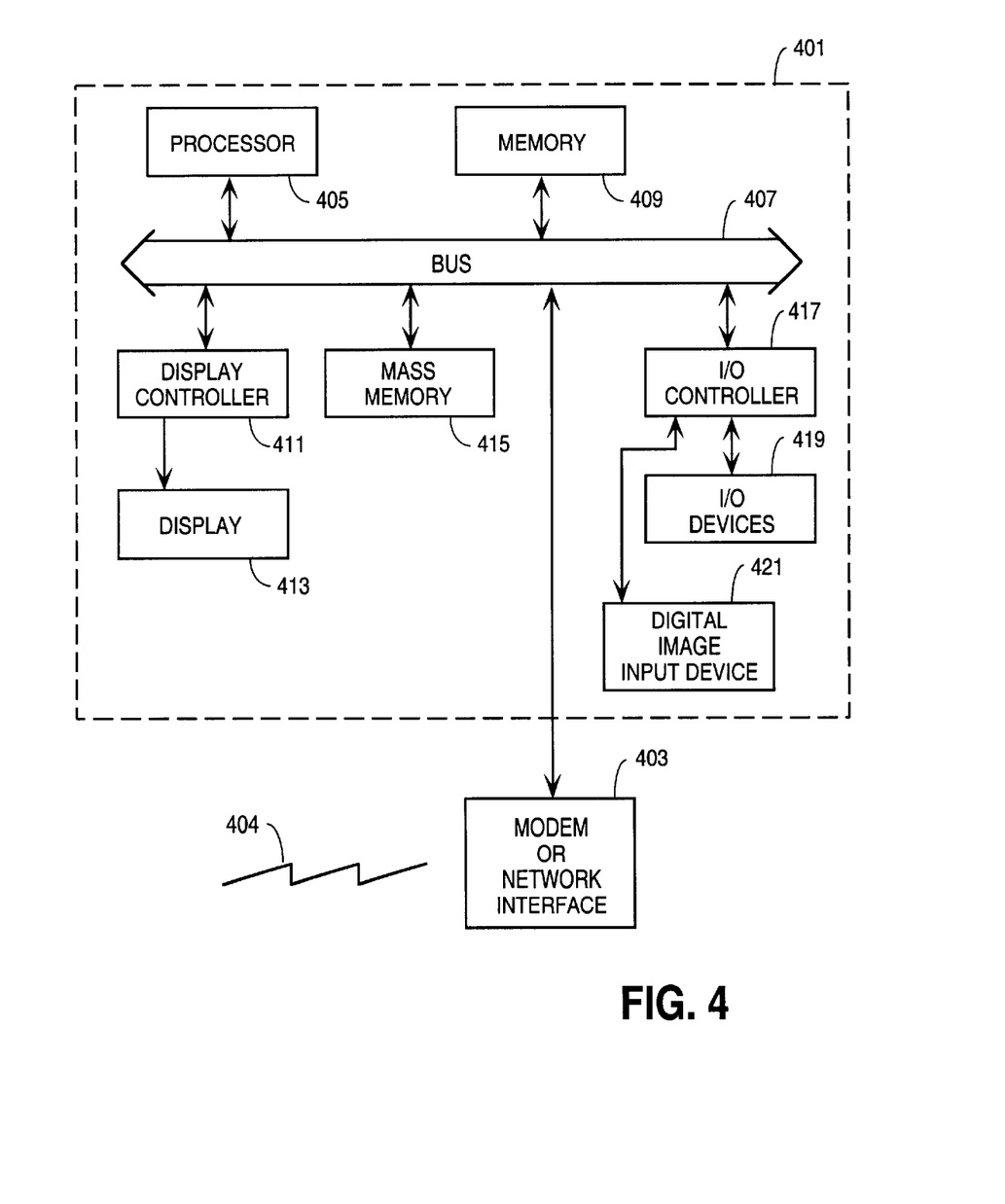
FIG. 4 is an illustration showing an example of a computer system that may be used accordance with the teachings of one embodiment of the present invention.

FIG. 4 shows one embodiment of a conventional computer system that may be used as a client computer system 401 or a server computer system or as a web server system. It will also be appreciated that a computer system 401 may be used to perform many of the functions of an Internet service provider, such as ISP 305. The computer system 401 interfaces to external systems through the modem or network interface 403. It will be appreciated that the modem or network interface 403 may be considered to be part of computer system 401. This interface 403 may be an analog modem, ISDN modem, cable modem, DSL modem, token ring interface, satellite transmission interface, (e.g. "DirectPC"), or other interfaces for coupling a computer system to other computer systems. As shown in FIG. 4, a carrier wave signal 404 is received/transmitted by modem of network interface 403 to communicate with computer system 401.

The computer system 401 includes a processor 405, which may be a conventional microprocessor such as an Intel x86 or Pentium family microprocessor or a Motorola 68K or PowerPC family microprocessor. Memory 409 is coupled to the processor 405 by a bus 407. Memory 409 may be dynamic random access memory (DRAM) and may include static random access memory (SRAM). The bus 407 couples the processor 405 to the memory 409 and also to mass memory 415 and to display controller 411 and to the I/O (input/output) controller 417.

The display controller 411 controls in the conventional manner a display on a display device 413 that may be a cathode ray tube (CRT), a liquid crystal display (LCD) or the like. The input/output devices 419 may include a keyboard, disk drives, printers, a scanner and other input and output devices, including a mouse, trackball or other pointing device. The display controller 411 and the I/O controller 417 may be implemented with conventional well known technology. A digital image input device 421 may be a digital camera that is coupled to an I/O controller 417 in order to allow images from the digital camera to be input into the computer system 401.

The mass memory 415 is often a magnetic hard disk, an optical disk, or another form of storage for large amounts of data. Some of this data is may be written by a direct memory access process, into memory 409 during execution of software in the computer system 401. It is appreciated that software may also be transmitted or received via modem or network interface 403. For the purposes of this specification, the term "computer readable medium" shall be taken to include any medium that is capable of storing or encoding a sequence of instructions for execution by a processor and cause the processor to perform the methodologies of the present invention. The term "computer readable medium" shall be taken to include, but not be limited to solid state memories, optical and magnetic disks, carrier wave signals, and the like. It will be appreciated that the computer system 401 is one example of many possible computer systems that have different architectures. For example, WINTEL systems often have multiple buses, one of which may be considered a peripheral bus. Network computers may also be considered to be a computer system that may be used with the present invention. Network computers may not include a hard disk or other mass storage, and the executable programs are loaded from a network connection into the memory 409 for execution by the processor 405. A typical computer system will usually include at least a processor 405, memory 409 and a bus 407 coupling memory 409 to processor 405.

It will also be appreciated that the computer system 401 is controlled by operating system software that includes a file management system, such as a disk operating system, which is part of the operating system software. One example of an operating system software with its associated file management system software is the operating system known as Windows from Microsoft Corporation of Redmond, Washington, and its associated file management system, including Windows Explorer. The file management system is typically stored in the mass memory 415 and causes the processor 405 to execute the various steps required by the operating system to input and output data and to store data in memory, including storing files on the mass memory 415.

Figure 5:
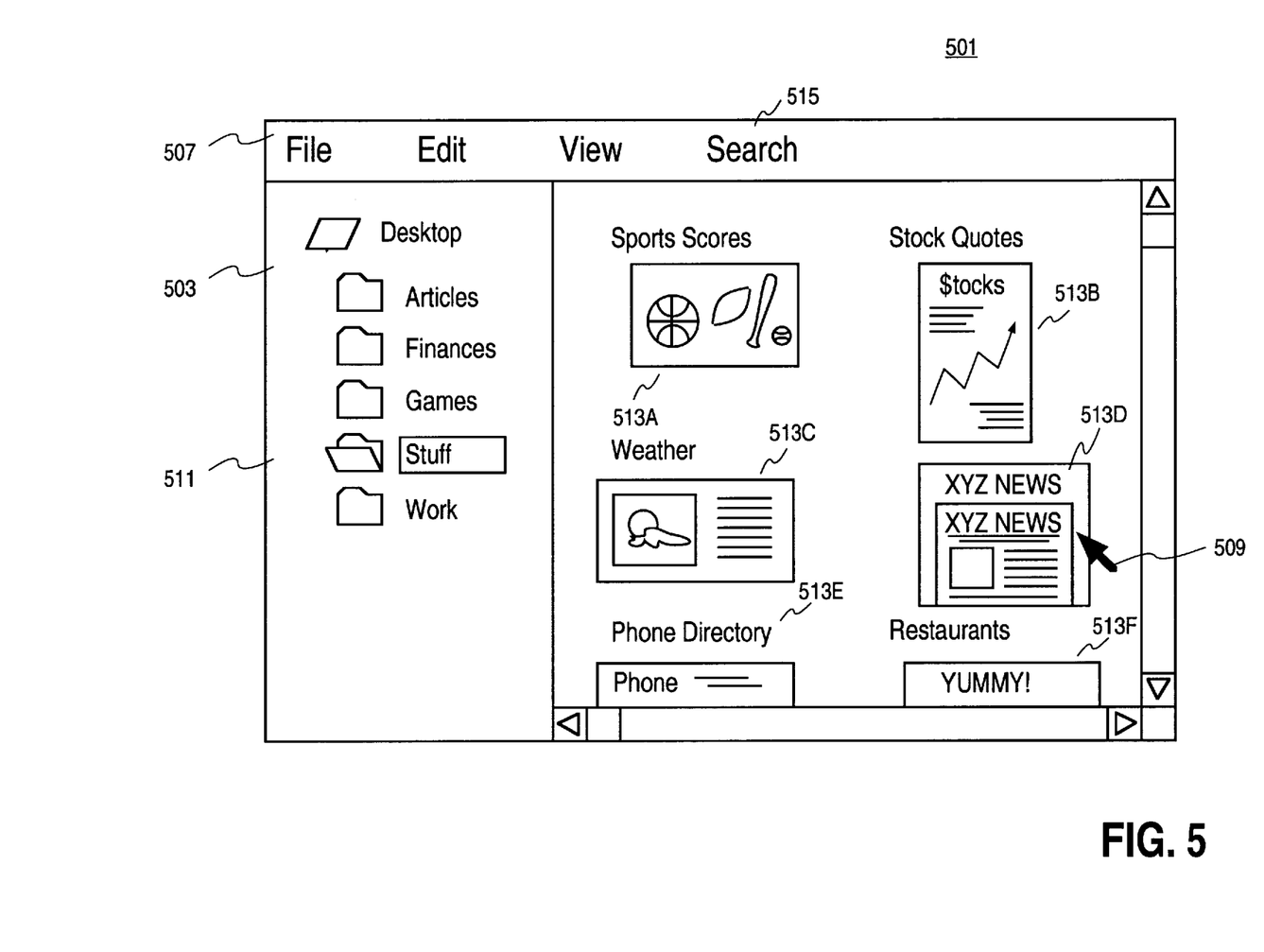
FIG. 5 is an illustration of one embodiment of an electronic document manager in accordance with the teachings of the present invention.

FIG. 5 will now be referred to describe one aspect of the present invention that relates to methods and apparatuses for managing electronic documents for use in a digital processing system, such as a computer system. FIG. 5 is an illustration of one embodiment of a window 501 of an electronic document manager for display on a display 413 in accordance with the teachings of the present invention. In one embodiment, window 501 includes a menu bar 507, a thumbnail region 505 and a path region 503. In the embodiment illustrated in FIG. 5, the "Stuff" directory 511, as shown being selected in path region 503, is being viewed in the thumbnail region 505. As illustrated in FIG. 5, thumbnail images 513A–F are visible in thumbnail region 505.

Operation of one embodiment of the present invention is as follows. Assume that a user accesses various electronic documents using various applications on a computer system, such as for example computer system 401 of FIG. 4. In some instances, a user may access a web page electronic document over the Internet, as illustrated in FIG. 3, or the user may access a local electronic document located in mass memory 415 of FIG. 4. For purposes of this disclosure, it is noted that web page type electronic documents may be stored in a variety of formats in accordance with teachings-of the present invention. For instance, known formats for web page electronic documents include but are not limited to HTML, dynamic HTML, active server pages, Extensible Markup Language (XML), Standard Generalized Markup Language (SGML), or the like. As the user accesses the various electronic documents on computer system 401, the user may desire to save the particular electronic documents being viewed or at least mark the electronic document for later review.

In one embodiment of the present invention, the visual representation displayed on display 413 is saved by the generation of an image file In one embodiment, the image file is a "screen dump" capturing the displayed visual representation. In another embodiment, the image file includes a plurality of screen dumps capturing an entire page of data. This embodiment is useful in situations where an entire page of information cannot be entirely displayed on a single screen of display 413. In the embodiment where a single screen is captured in the image file, the image file may contain the entire page or at least a portion of the page. In one embodiment, the amount of information stored in the image file is selected by configuring or resizing the window of the particular application being used to access the electronic document. It is appreciated that resizing windows to adjust the portion of a page being displayed is well known in the art.

In one embodiment, image file is stored in a compressed graphics format to reduce the amount of storage space required to store the image file. In one embodiment, the particular compressed graphics format used is based at least in part on the type of format in which the visual representation of electronic document is displayed on display 413. For example, if the visual representation displayed for electronic document is a black and white image, a compressed graphics format suitable for black and white images is utilized for the stored image file. If the visual representation of electronic document is a color image, then a compressed graphics format suitable for storing compressed color images is used for storing image file 601.

In one embodiment of the present invention, the user has the option to select the compressed graphics format used for generating the stored image file. In another embodiment of the present invention, the user has the option of setting the degree of compression of the compressed graphics format for stored image file. Compressed graphics formats that are suitable for use in accordance with the teachings of the present invention include but are not limited to Joint Photographic Experts Group (JPEG), Graphics Interchange Format (GIF), Tagged Image File Format (TIFF), or other known graphics formats.

After the image file is generated, a corresponding thumbnail image is generated and is added to the thumbnail region 505 of manager window 501. For purposes of this specification, a thumbnail may be considered a smaller representation of the visual representation of the stored image file. Assume that a user browses various electronic documents including various web pages on the Internet. In the example illustrated in FIG. 5, the user has saved various electronic documents for subsequent viewing including documents relating to sports scores, stock quotes, weather, news, a phone directory and restaurants. As such, the displayed visual representation of each of these electronic documents was captured in an image file from which thumbnail representations were generated. These thumbnails are illustrated in the thumbnail region 505 as "Sports Scores" 513A, "Stock Quotes" 513B, "Weather" 513C, "XYZ News" 513D, "Phone Directory" 513E and "Restaurants" 513F. It is appreciated of course that the above list of saved electronic documents has been provided for example purposes only and that a user may select other electronic documents to be added to thumbnail region 505 in accordance with the teachings of the present invention.

It is noted that thumbnails 513A–F each have different respective shapes and sizes. In one embodiment of the present invention, the shape of the thumbnails displayed in thumbnail region 505 correspond directly to the size and shape of the respective application window at the time the user generated the image file capturing the displayed visual representation of the electronic document.

In one embodiment of the present invention, there are two locations associated with each thumbnail displayed in thumbnail region 505. One of the two locations is the location at which the electronic document was accessed when the image file capturing the displayed visual representation of the electronic document was generated. For example, it the electronic document is a web page on the Internet, then the first location is the URL of the HTML document on the Internet, such as for example on web sever 309. If the electronic document is for example a word processing document stored locally on computer system 401, then the first location would be the directory path to the word processing document in computer system 401, such as for example in mass memory 415. If the electronic document is for example a spreadsheet document stored on another computer system accessible through a network connection, then the first location would be the directory path to the spreadsheet document over the network. In one embodiment, the electronic document may be stored locally or in another computer on the network, a LAN server, or the like.

The other location associated with each thumbnail is the location of the image file in which the captured displayed visual representation is stored. In one embodiment, the image file is stored locally in mass memory 415. Thus, the second location in this embodiment is the path to the locally stored image file in mass memory 415. In another embodiment, the image file may be stored in another location such as a remote mass memory 415 accessed through a network over modem or network interface 403. In this embodiment, the second location is the path to the stored image file over the network.

In one embodiment of the present invention, a user may move cursor 509 to select any of the thumbnails displayed in thumbnail region 505. For example, FIG. 5 shows cursor 509 selecting the thumbnail for "XYZ News" 513D. In one embodiment, after the thumbnail is selected, the user has the option to view either the electronic document, which is accessed at the first location, or the image file, which is accessed at the second location. In another embodiment, the user may select a default location and the user may access the default location by double-clicking on the particular thumbnail.

For example, assume that "XYZ News" 513D is a thumbnail corresponding to an "XYZ News" web site on the Internet at web server 309. Assume further that the "XYZ News" web site is located at a URL of "http://www.xyznews.com." If the user double-clicks on the "XYZ News" 513D thumbnail, one embodiment of the present invention will automatically launch the web browser application on computer system 401 and access the "XYZ News" web site at "http://www.xyznews.com." If the user decides to view the stored image file, then the computer will automatically open a viewer image window to view the saved visual representation of the "XYZ News" web page stored locally in mass memory 415 of computer system 401. As can be appreciated, the image file stored locally in mass memory 415 will be the same displayed visual representation of the "XYZ News" web site at the time the user captured the image. Therefore, even if the "XYZ News" web site changes or is no longer available on the Internet at web server 309, the stored image file will be preserved in mass memory 415. Furthermore, it is appreciated that by storing the image file locally in computer system 401, the user may view the saved image file without having to access the original electronic document on the Internet. This aspect of the present invention would be useful for a user that later wishes to review the stored image file without having to go "on-line" and access the Internet.

In one embodiment, the textual information included in the visual representations displayed on display 415 is preserved when the above described image files are generated and the thumbnail representations are added to thumbnail regions 505. The preserved textual information is then added to a database of searchable terms in accordance with the teachings of the present invention. Therefore, a user may subsequently search for key words or phrases of the electronic documents that are saved in electronic document manager window 501. For example, FIG. shows a "Search" 515 command included in menu bar 507 of manager window 501. In one embodiment, a user may select the "Search" 515 command and search for a particular key word or phrase included in the content of a particular electronic document listed in thumbnail region 505. It is appreciated that this aspect of the present invention enables users to quickly locate and access electronic documents based on content.

In one embodiment of the present invention, the textual information is preserved from HTML documents by stripping away nontextual information, such as for example graphics, program modules, links, audio, etc. Once the textual information is identified, the text can be added a searchable database using known techniques. The searchable database can then be searched later in response to "Search" 515 command using known techniques.

In one embodiment of the present invention, a user has an option to annotate the saved image file. By adding annotations to the stored image file, the user has the option of adding his or her thoughts and comments by adding notes, graphics or the like to the image file using known techniques. When the user subsequently views the stored image file, the user in one embodiment has the option of viewing the image file with the annotations displayed or without the annotations displayed.

In one embodiment, the user may provide the stored image file to another user using known techniques, such as for example copying the image file a floppy disk, transferring the image file across the network, enclosing the image file in an electronic mail message, or the like. It is appreciated that by providing the stored image file to the other user instead of simply providing the user with the original URL of the web page, the other user will be able to view the same captured visual representation as originally displayed, independent of whether the other user has Internet access or compatible plug-ins, web browser software, or the like.

In another embodiment, data of the stored image file is copied and combined with executable viewer code to form a self-contained executable program to view the image data of the stored image file. It is appreciated that the self-contained executable file may be provided to another user to enable that user to view the stored image file even if the other user does not have software with the ability read the stored image file. The self-contained viewer application may then be provided to the other user using the above described methods, which include but are not limited to copying the executable file to a floppy disk, transferring the file across a network, electronically mailing the file to the other user, or other similar techniques. In one embodiment, the other user may use the contained viewing application to view the visual representation of the stored image file, optionally view any annotations added by the user or access directly the electronic document at the first location on the Internet, if applicable.

Figure 6:
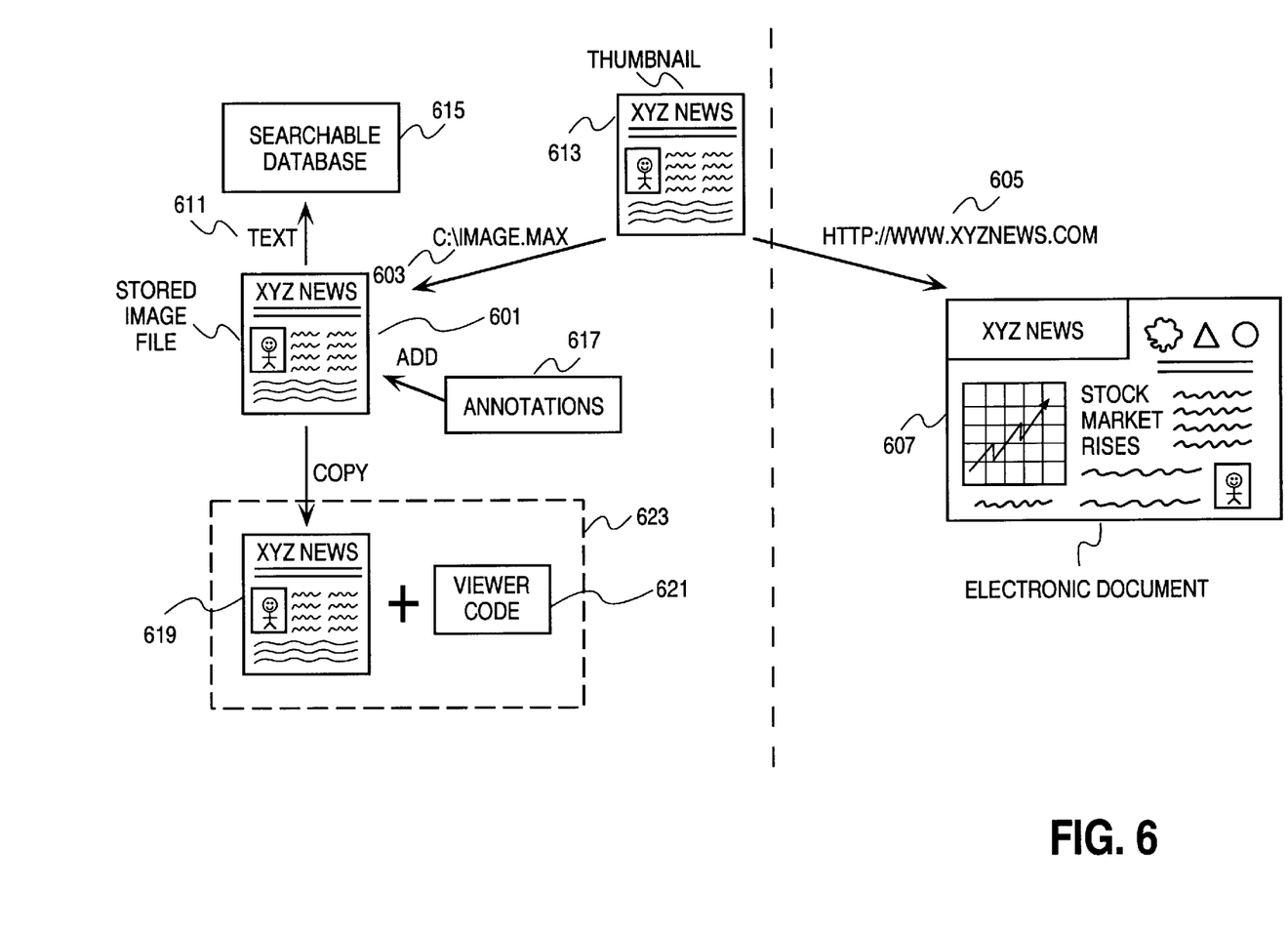
FIG. 6 is a block diagram illustrating the relationship between a stored image file, a thumbnail and an HTML document on the Internet in accordance with the teachings of one embodiment of the present invention.

FIG. 6 is a block diagram illustrating the relationship between various elements of one embodiment of the present invention. In particular, FIG. 6 shows a thumbnail 613, which is in one embodiment a smaller lower resolution representation of stored image file 601. In the embodiment illustrated in FIG. 6, stored image file 601 stored at a location 603, which is shown as "c:\image.max" as an example for explanation purposes. As shown in FIG. 6, location 603 is associated with thumbnail 613 such that stored image file 601 may be accessed in connection with thumbnail 613. In addition, location 605 is also associated with thumbnail 613 such that an electronic document 607 may be accessed in connection with thumbnail 613. In the example illustrated in FIG. 6, electronic document 607 is an HTML document accessed on the Internet at location 605, which in FIG. 6 is illustrated for explanation purposes as the URL "http://www.xyznews.com."

As illustrated in FIG. 6, it is appreciated that web pages may change from time to time. Accordingly, the visual representation of electronic document 607 is different than the visual representation stored in image file 601, which was captured at an earlier time.

FIG. 6 also shows that a copy 619 of data of the stored image file 601 may be combined with viewer code 621 to form a self-contained executable viewer application 623. Self-contained executable viewer application 623 may be executed to view the visual representation of image file 601. As a result, self-contained executable viewing program 623 may be saved for archival purposes or may be provided to another user via known techniques, which include copy to a floppy disk, transfer over a network, transfer using electronic mail, or other known techniques for transferring files. In one embodiment, the other user may view the copy of the stored image file 619, with or without annotations 617, without having to access electronic document 607 at location 605 over the Internet. In one embodiment, the other user has the option to access electronic document 607 at location 605 when executing self-contained viewing application 623.

In summary, a user in accordance with the teachings of one embodiment of the present invention may select a thumbnail 613 in thumbnail region 505 of electronic document manager window 501 and optionally view either the actual electronic document 607 at location 605 or a stored image file 601 at location 603. When viewing electronic document 607 at location 605, the user need not access the stored image file at location 603. Similarly, when the user accesses stored image file 601 at location 603, the user need not access electronic document 607 at location 605. When trying to find a particular electronic document 607 or stored image file 601 of interest, the user may search searchable database 615 for key words or phrases to find the electronic document or stored image file of interest based on content. The user has the option of adding annotations 617 to stored image file 601 to help memorialize any thoughts or comments the user may have. The user also has the option of creating a self-contained executable viewing application 623 including a copy of data of the stored image file 619 and executable viewer code 621. The user has the option of archiving or providing another user with a copy of stored image file 601 or the self-contained executable viewing program 623.

Figure 7:
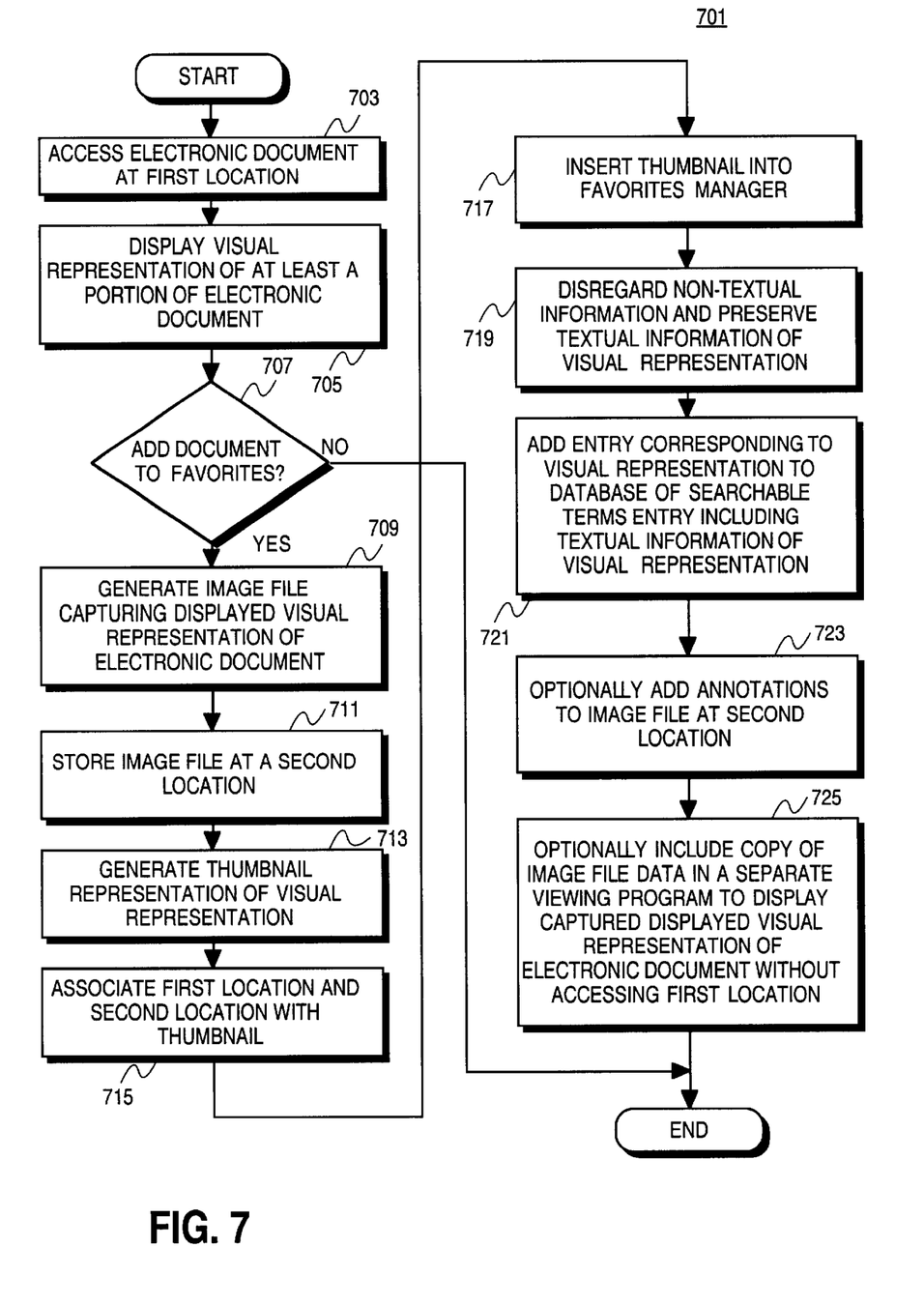
FIG. 7 is a flow diagram illustrating steps performed to manage electronic documents in accordance with the teachings of one embodiment of the present invention.

FIG. 7 is a flow diagram illustrating steps performed in accordance with the teachings of one embodiment of the present invention. Processing step 703 shows that an electronic document of interest is accessed at a first location. In one embodiment, the electronic document may be accessed over the Internet using a web browser or the electronic document may be a word processing file accessed with a word processing application, or a spreadsheet file accessed with a spreadsheet application, etc.

Processing step 705 shows that a visual representation of at least a portion of the electronic document is displayed. For example, at least a portion of a large web page is displayed in the window of a web browser application.

Processing step 707 shows that the user has the option of saving the electronic document in accordance with the teachings of the present invention by adding the document to the "Favorites." In one embodiment, adding the electronic document to the "Favorites" adds or updates a corresponding entry in the electronic document manager window 501. By way of example, the user may wish to add a thumbnail representation of a web page to the thumbnail region 505 of the manager window 501 illustrated in FIG. 5.

If the user decides to add the document to the favorites in accordance with processing steps 707, processing step 709 shows that an image file is generated, which captures the displayed visual representation of the electronic document. For example, if the user is viewing a color visual representation of a web page, a corresponding compressed JPEG file is generated in one embodiment of the present invention.

Processing step 711 shows that the image file is stored at a second location. For example, in one embodiment a JPEG image file of the captured displayed visual representation is stored at a second location in the mass memory 415 of the computer system 401.

Processing step 713 shows that a thumbnail representation of the visual representation captured in the image file of processing step 711 is generated.

Processing step 715 shows that the first location at which the electronic document was accessed and the second location at which the image file is stored are associated with the thumbnail representation of processing step 713.

Processing step 717 shows that the thumbnail is then inserted or added to the favorites manager. For example, when a user chooses to save another electronic document, an additional thumbnail is added to the thumbnail region 505 of the electronic document manager 501 illustrated in FIG. 5.

Processing step 719 shows that the textual information of the visual representation is preserved and that the nontextual information is stripped away or disregarded.

Next, processing step 721 shows that an entry corresponding to the displayed visual representation is added to a database of searchable terms. The new entry includes the textual information of the visual representation preserved in processing step 719. For example, if the user was "surfing" the Internet and found an interesting "XYZ News" web page article regarding widgets, and the text "widgets" was displayed when the user saved the electronic document, the preserved text would include "widgets." The preserved text would therefore be added to the searchable database, which is illustrated as searchable database 615 in FIG. 6. Thereafter, if the user executed the "Search" 515 command of FIG. 5, and searched using the term "widgets," the search engine would return a hit corresponding to the saved "XYZ News" web page regarding "widgets."

Processing step 723 illustrates that the user may optionally add annotations to the image file, which is stored at the second location. For example, the user may add a note to the image file indicating that the "XYZ News" web page regarding "widgets" was of interest to the user for a particular reason.

Processing step 725 shows that the user also has the option of including a copy of the image file data in a separate self-contained executable viewing program to display the captured displayed visual representation of the electronic document without having to access a first location. For example, the user can create the self-contained viewing program to include the "XYZ News" web page regarding "widgets" and the user can then provide the executable self-contained viewing program to another user for his or her reference. The other user can view the stored image file without any additional specialized software. The other user can receive the self-contained executable viewing program through known techniques including electronic mail, known file transfer techniques, floppy disk, etc.

Figure 8:
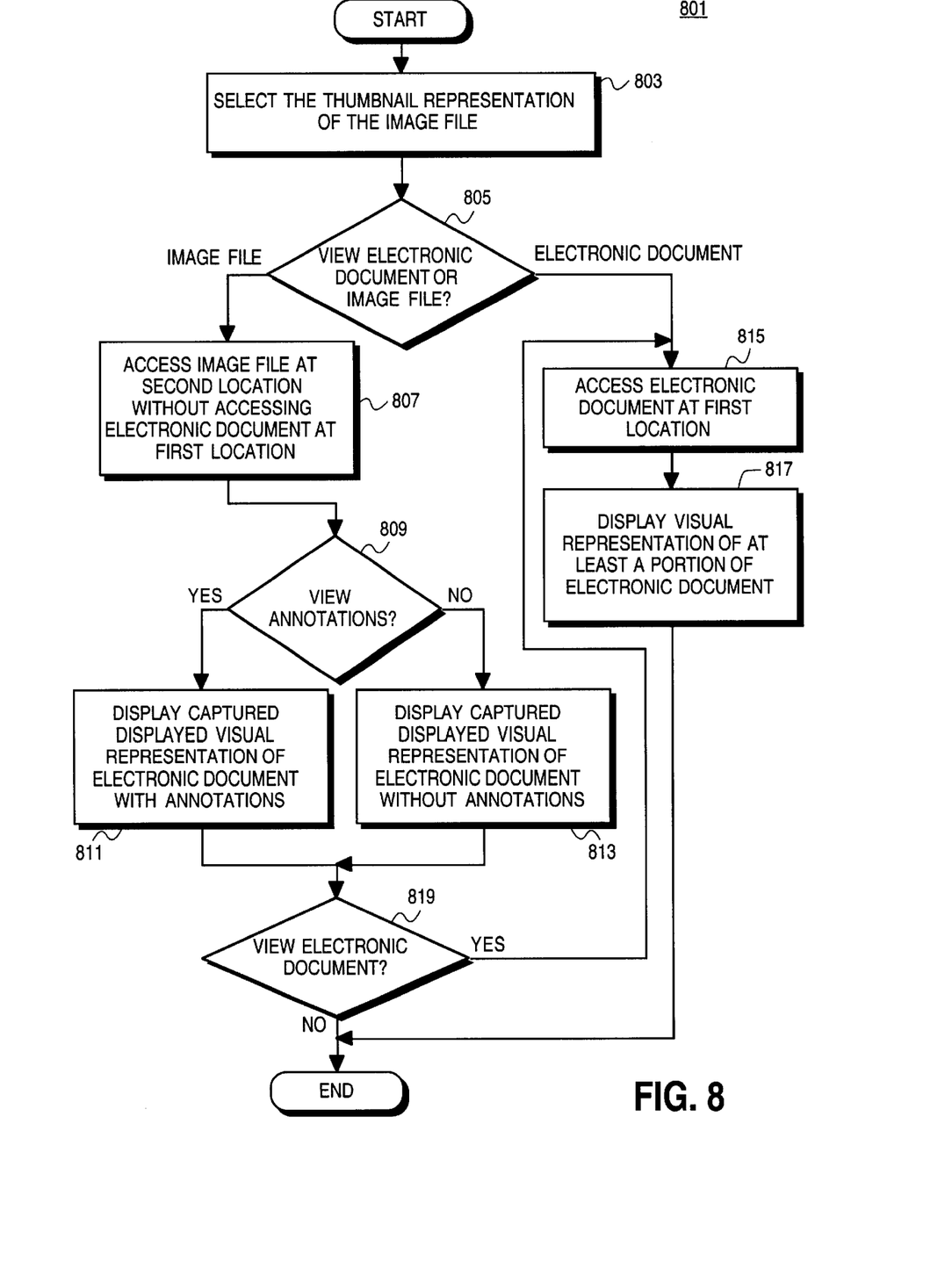
FIG. 8 is a flow diagram illustrating steps performed to display electronic documents in accordance with the teachings of one embodiment of the present invention.

FIG. 8 is a flow diagram illustrating steps performed in accordance with the teachings of the present invention when selecting and viewing the saved electronic document after a corresponding thumbnail has been added to the electronic document manager 501 in accordance with the teachings of the present invention. For example, processing step 803 shows that the thumbnail representation of the image file is first selected. This is also shown in FIG. 5 with cursor 509 selecting "XYZ News" thumbnail 513D. Next, processing step 805 shows that the user is given the option of viewing either the electronic document or the image file. If the user decides to view the image file, then processing step 807 shows that the image file is accessed at the second location without having to access to electronic document at the first location. For example, if the user decides to view the image file of the "XYZ News" web page regarding "widgets," the image file is accessed locally on mass memory 415 of computer system 401 without having to access the electronic document located on the Internet.

Processing step 809 shows that the user then has the option of viewing annotations. If the user decides to view the image file with annotations, the captured displayed representation of electronic document is displayed with the annotations, as shown in processing step 811. If the user decides not to view the annotations, then processing step 813 shows that the captured displayed visual representation of electronic document is displayed without annotations.

After the user views the image file with or without annotations as described above in processing steps 811 or 813, the user has in one embodiment the option of proceeding to view the electronic document, as shown in processing step 819. This aspect of the present enables users to first view the stored image files with annotations and then allows the users to view the actual electronic documents "on-line" for further study.

If the user decides to view the electronic document after selecting the thumbnail representation in processing steps 803 and 805, then processing step 815 shows that the electronic document is accessed at the first location. For example, if the user decided to view the current version of the "XYZ News" web page, then that web page is accessed on the Internet at the URL corresponding to the first location.

Processing step 817 shows that the visual representation of the electronic document is then displayed. For example, a web browser window is then opened or refreshed to display the web page located at the URL corresponding to the first location, which is the "XYZ News" web page.

The foregoing description has provided numerous examples of the present invention. It will be appreciated that various modifications and changes may be made thereto without departing from the broader spirit and scope of the invention as set forth in the appended claims.

What is claimed is:

1. A method of managing an electronic document, comprising:

generating an image file capturing a displayed visual representation constructed from at least a portion of the electronic document accessed at a first location;

storing the image file at a second location; and associating a first pathname to the first location where the portion of the electronic document is accessed and a second pathname to the second location where the image file is stored with a representation of the image file.

2. The method of claim 1 further comprising:

preserving textual information included in the displayed visual representation; and adding an entry to a database of searchable terms, the entry corresponding to the displayed visual representation and including the textual information.

3. The method of claim 1 further comprising:

selecting the representation of the image file; and accessing in response to a user selection between the first and second locations the electronic document at the first location or the image file stored at the second location.

4. The method of claim 1 wherein the electronic document includes a web page accessed from the first location in a server computer.

5. The method of claim 4 wherein the displayed visual representation is constructed based on a web page formatted document.

6. The method of claim 1 wherein the electronic document is accessed from the first location in a mass memory of a computer.

7. The method of claim 6 wherein the mass memory of the computer is accessed over a network.

8. The method of claim 1 wherein the portion of the electronic document of the displayed visual representation is selected by configuring a window to display the displayed visual representation.

9. The method of claim 1 wherein the image file is stored as a file having a compressed graphics format.

10. The method of claim 9 further comprising selecting the compressed graphics format in which to store the image file.

11. The method of claim 1 wherein the image file is stored as a Joint Photographic Experts Group (JPEG) file.

12. The method of claim 1 wherein the first pathname to the first location includes a uniform resource locator (URL) address.

13. The method of claim 1 wherein the second pathname to the second location includes a directory path to the image file stored in a mass memory of a computer.

14. The method of claim 13 wherein the mass memory of the computer is accessed over a network.

15. The method of claim 1 wherein the first pathname to the first location includes a directory path to the electronic document stored in a mass memory of a computer.

16. The method of claim 15 wherein the mass memory of the computer is accessed over a network.

17. The method of claim 1 wherein the representation of the image file includes a smaller representation of the displayed visual representation captured in the image file.

18. The method of claim 1 further comprising annotating the image file.

19. The method of claim 1 further comprising associating the first pathname to the first location with the image file.

20. The method of claim 1 further comprising viewing the displayed visual representation captured in the image file at the second location without accessing the electronic document at the first location.

21. The method of claim 1 further comprising including a copy of data of the image file in a viewing program to view the displayed visual representation captured in the image file without accessing the electronic document at the first location.

22. The method of claim 21 further comprising providing the viewing program to another computer to view the displayed visual representation captured in the image file without accessing the electronic document at the first location and without accessing the image file at the second location.

23. A method of managing an electronic document, comprising:

capturing a displayed visual representation constructed from at least a portion of the electronic document accessed at a first location;

preserving textual information included in the displayed visual representation;

adding an entry to a database of searchable terms, the entry associated with the displayed visual representation and the textual information; and associating a first pathname to the first location with a representation of the displayed visual representation.

24. The method of claim 23 further comprising:

generating an image file capturing the displayed visual representation;

storing the image file at a second location; and associating a second pathname to the second location with the representation of the displayed visual representation.

25. The method of claim 24 further comprising:

selecting the representation of the image file; and accessing in response to a user selection between the first and second locations the electronic document at the first location or the image file stored at the second location.

26. The method of claim 23 wherein preserving textual information included in the displayed visual representation comprises disregarding non-textual information.

27. The method of claim 23 wherein the electronic document at the first location is accessed using a web browser application.

28. The method of claim 23 wherein the electronic document includes web page formatting information including the textual and nontextual information.

29. The method of claim 23 further comprising:

performing a keyword search of the database, the keyword search containing terms corresponding to the textual information; and retrieving the entry corresponding to the displayed visual representation.

30. The method of claim 24 wherein a graphics format in which the image file is stored is based on a type of format in which the visual representation is displayed.

31. The method of claim 24 further comprising adding annotations to the image file.

32. The method of claim 23 further comprising including a copy of data of the image file in a self-contained viewing program to view the displayed visual representation captured in the image file without accessing the electronic document at the first location and without accessing the image file at the second location.

33. The method of claim 32 wherein the self-contained viewing program includes an option of viewing the displayed visual representation without the annotations.

34. The method of claim 33 further comprising providing the self-contained viewing program to another computer to view the displayed visual representation captured in the image file without accessing the electronic document at the first location and without accessing the image file at the second location.

35. A computer readable medium having sequences of instructions stored therein, which when executed cause a processor to perform a method comprising:

generating an image file capturing a displayed visual representation constructed from at least a portion of the electronic document accessed at a first location;

storing the image file at a second location; and associating a first pathname to the first location where the portion of the electronic document is accessed and a second pathname to the second location where the image file is stored with a representation of the image file.

36. The computer readable medium of claim 35, wherein the method further comprising:

preserving textual information included in the displayed visual representation; and adding an entry to a database of searchable terms, the entry corresponding to the displayed visual representation and including the textual information.

37. The computer readable medium of claim 35, wherein the method further comprising:

selecting the representation of the image file; and accessing in response to a user selection between the first and second locations the electronic document at the first location or the image file stored at the second location.

38. The computer readable medium of claim 35, wherein the electronic document includes a web page accessed from the first location in a server computer.

39. The computer readable medium of claim 38, wherein the displayed visual representation is constructed based on a web page document.

40. The computer readable medium of claim 35, wherein the electronic document is accessed from the first location in a mass memory of a computer.

41. The computer readable medium of claim 40, wherein the mass memory of the computer is accessed over a network.

42. The computer readable medium of claim 35, wherein the portion of the electronic document of the displayed visual representation is selected by the processor further configuring a window to display the displayed visual representation.

43. The computer readable medium of claim 35, wherein the image file is stored as a file having a compressed graphics format.

44. The computer readable medium of claim 35, wherein the method further comprises selecting the compressed graphics format in which to store the image file.

45. The computer readable medium of claim 35, wherein the image file is stored as a Joint Photographic Experts Group (JPEG) file.

46. The computer readable medium of claim 35, wherein the first pathname to the first location includes a uniform resource locator (URL) address.

47. The computer readable medium of claim 35 wherein the second pathname to the second location includes a directory path to the image file stored in a mass memory of a computer.

48. The computer readable medium of claim 47 wherein the mass memory of the computer is accessed over a network.

49. The computer readable medium of claim 35, wherein the first pathname to the first location includes a directory path to the electronic document stored in a mass memory of a computer.

50. The computer readable medium of claim 49, wherein the mass memory of the computer is accessed over a network.

51. The computer readable medium of claim 35, wherein the representation of the image file includes a smaller representation of the displayed visual representation captured in the image file.

52. The computer readable medium of claim 35, wherein the method further comprises annotating the image file.

53. The computer readable medium of claim 35, wherein the method further comprises associating the first pathname to the first location with the image file.

54. The computer readable medium of claim 35, wherein the method further comprises viewing the displayed visual representation captured in the image file at the second location without accessing the electronic document at the first location.

55. The computer readable medium of claim 35, wherein the method further comprises including a copy of data of the image file in a viewing program to view the displayed visual representation captured in the image file without accessing the electronic document at the first location and without accessing the image file at the second location.

* * * * *